March 8, 1966  A. D. WILLIAMS  3,239,807

MOTOR VEHICLE SIGNAL SYSTEM

Filed Feb. 12, 1964  4 Sheets-Sheet 1

INVENTOR
*ALFRED D. WILLIAMS*

BY *Bean, Brooks, Buckley & Bean*
ATTORNEY

March 8, 1966   A. D. WILLIAMS   3,239,807
MOTOR VEHICLE SIGNAL SYSTEM
Filed Feb. 12, 1964   4 Sheets-Sheet 3
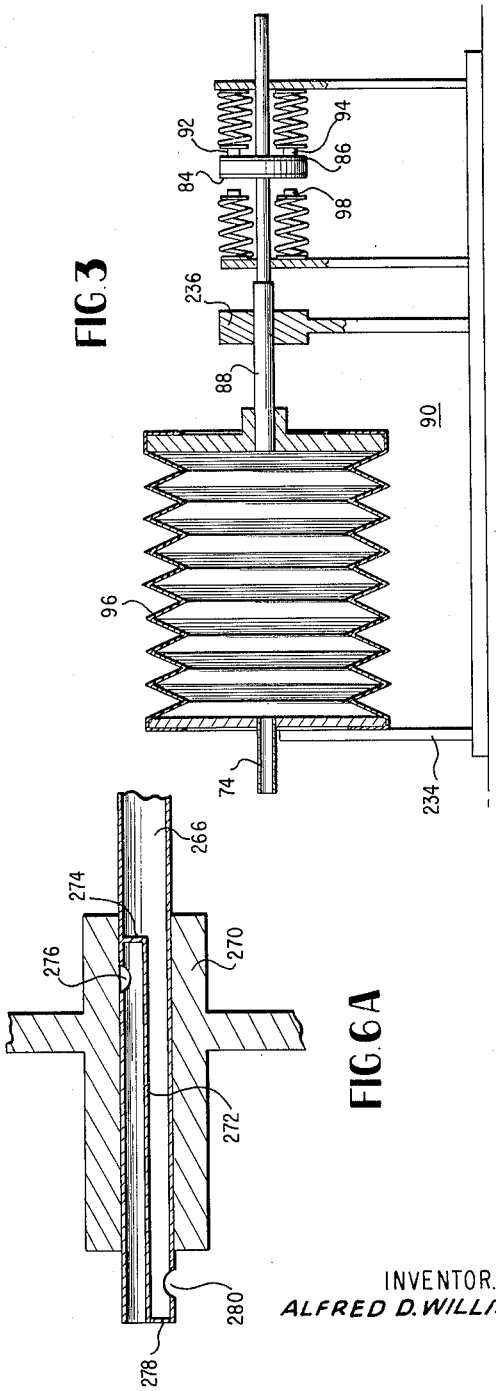
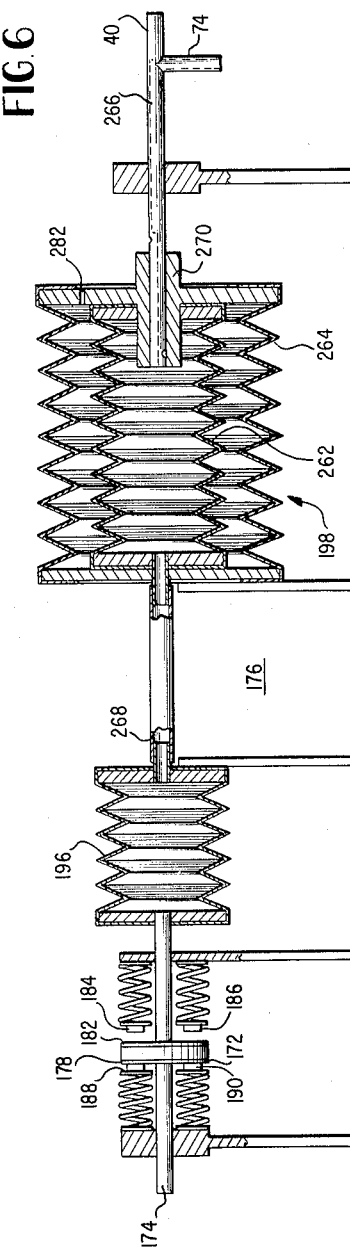
INVENTOR.
ALFRED D. WILLIAMS
BY Bean, Brooks, Buckley & Bean
ATTORNEY March 8, 1966  A. D. WILLIAMS  3,239,807
MOTOR VEHICLE SIGNAL SYSTEM
Filed Feb. 12, 1964  4 Sheets-Sheet 4
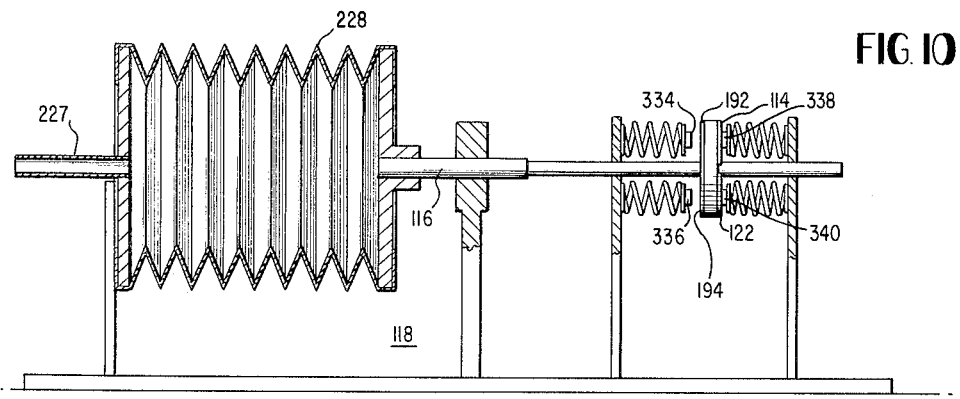
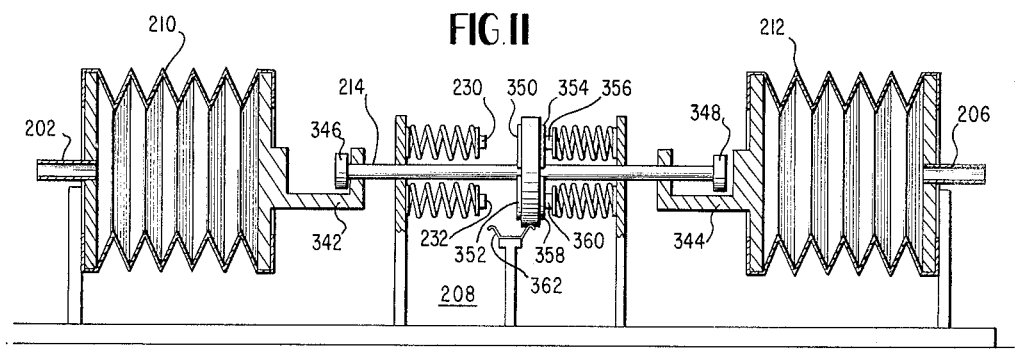
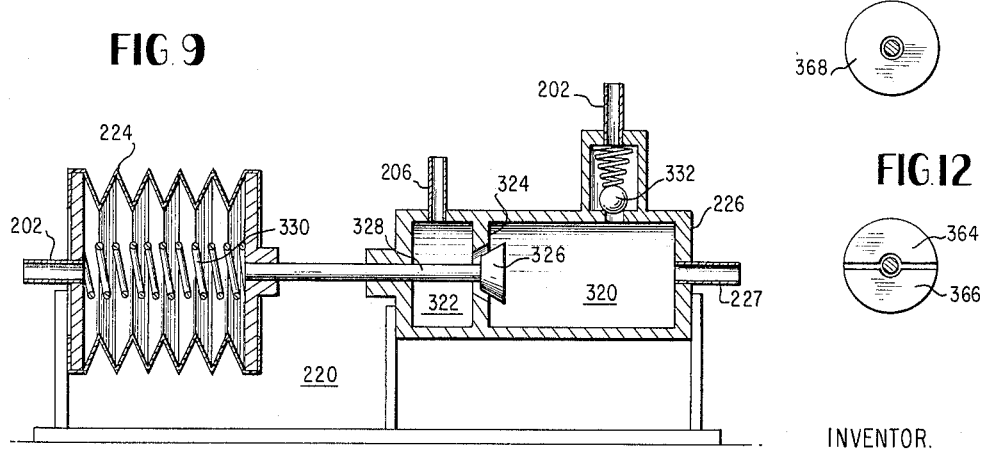
INVENTOR.
ALFRED D. WILLIAMS
BY
Bean, Brooks, Buckley & Bean
ATTORNEY

3,239,807
MOTOR VEHICLE SIGNAL SYSTEM
Alfred D. Williams, 15 Hillcrest Ave., St. Catharines,
Ontario, Canada
Filed Feb. 12, 1964, Ser. No. 344,410
18 Claims. (Cl. 340—67)

This invention pertains generally to signal systems for vehicles and the like, and more particularly to a signal system for providing an indication of the attitude of the vehicle.

One of the most common types of automotive accidents is the rear-end collision, and the high incidence of this type of accident indicates that the effectiveness of the signal systems presently utilized to prevent such accidents leaves a great deal to be desired. A pursuing or following driver is potentially capable of preventing a rear-end collision if he has sufficient warning of the driving attitude, or change of driving attitude, of the car ahead. That is to say, where a following driver is continuously apprised of the attitude (acceleration, deceleration, braking, reverse, park, etc., and appropriate combinations thereof) of the car ahead, as well as of changes in such attitude, he can generally govern his own driving actions in a manner that will greatly reduce rear-end collisions.

A constant red taillight or lights viewed at night or under conditions of poor visibility does not indicate whether the vehicle in question is stationary or moving, and if the latter, whether moving forward or backward. In this day of high-speed highway traffic, it is essential that other drivers be informed of the attitude of a given car if the toll in injuries and property loss due to collisions is to be reduced.

It is accordingly a primary object of the present invention to provide an improved vehicle signal light system.

A more specific object of the invention is to provide a vehicle safety signal system which is capable of providing an indication of the driving attitude of the vehicle.

A further object of the invention is to provide a vehicle safety signal system which is capable of rapidly indicating a change in the driving attitude of a vehicle.

In accordance with the present invention, the above and other objects are achieved by means of a safety signal system operated in accordance with the setting or positioning of the brake, accelerator, transmission control and turn indicator of the associated vehicle to appropriately energize a plurality of signal lights, preferably comprising two red, one amber and one white light on each side of the rear of the vehicle. In the preferred embodiment set forth in detail herein, the several signals provided by this system are as follows:

(1) If the car is parked with the engine off and the headlight switch on, both lights of a first pair of red taillights are continuously energized.

(2) If the vehicle is stationary with the engine running and the drive selector or transmission control in PARK, NEUTRAL or one of the forward drive settings (D1, D2 or L), with the accelerator in the retarded position, the lights of such first pair of red taillights are alternately energized to provide a flashing right and left signal.

(3) If the accelerator is advanced with the drive selector in one of the forward drive positions, indicating forward motion of the vehicle, both amber lights are continuously energized.

(4) If the accelerator is retarded with the drive selector in one of the forward drive positions, indicating deceleration of the vehicle, the two amber lights are simultaneously energized by an interrupted current, providing bilateral flashing amber lights.

(5) If the brake is applied, the two lights of the first pair of red lights are simultaneously energized with an interrupted current to provide bilateral flashing red lights.

(6) When the vehicle comes to rest as a result of braking or gradual deceleration, with the engine running, as in condition two above, the lights of the first pair of red lights are alternately energized to provide an alternate flashing right and left red light signal.

(7) When the transmission control is set to the REVERSE position, the pair of amber lights and the first pair of red lights are energized in alternation, giving a signal of two red lights, then two amber lights, and so on alternately, along with steady illumination of the white back-up lights.

(8) When the turn indicator is operated to indicate a right or left turn, one or the other of the second pair of red lights is energized, to provide a flashing red light on the appropriate side of the vehicle. A turn combined with gradual deceleration is indicated by the foregoing flashing red light combined with a flashing amber light on the same side of the vehicle. A turn combined with braking is indicated by two flashing red lights on the appropriate side of the vehicle.

With the above considerations and objects in mind, the invention itself will now be described in connection with a preferred embodiment thereof given by way of example and not of limitation, and with reference to the accompanying drawings in which:

FIG. 3 is a vertical section view of the signal activation and parking switch of FIG. 2.

FIG. 6 is a vertical section view of the motion deceleration indicator of FIG. 2.

FIG. 6A is a detailed view of a portion of the device of FIG. 6.

FIG. 9 is a vertical section view of the vacuum directional control valve of FIG. 2.

FIG. 10 is a vertical section view of the braking and stop indicator switch of FIG. 2.

FIG. 11 is a vertical section view of the flash circuit transfer switch of FIG. 2, and FIGS. 12 and 13 are detailed views of the faces of the contacts employed in the devices of the invention.

Figure 1:
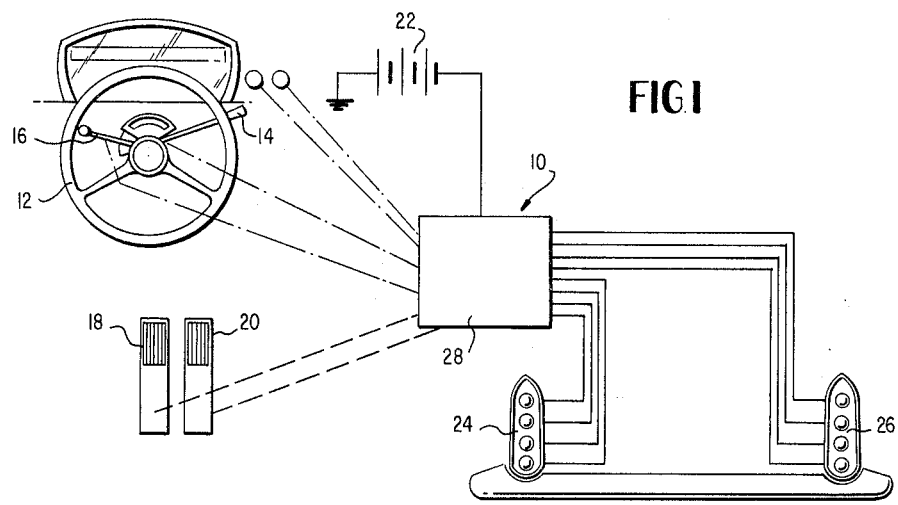
FIG. 1 is a schematic representation of the equipment of the safety light signal system of the present invention, showing its relationship to the associated vehicle.

Referring now particularly to FIG. 1, a vehicle is indicated generally by reference numeral 10, including a steering wheel 12, transmission or drive control 14, turn indicator control 16, brake 18, accelerator 20 and battery 22. The signal lights of the present invention are indicated generally at 24 and 26, comprising two groups of four lights each, with each group preferably including two red, one amber and one white light. The several lights in the two groups are separately connected to appropriate control circuitry in the control means 28, to which electrical power is supplied by the battery 22. As is indicated in the drawing, elements 14, 16, 18 and 20 are mechanically connected to appropriate control means (not shown) in the control apparatus 28, as will be further described herein. In brief, the several signal lights in the left and right groups 24 and 26 are selectively energized by the voltage source 22 in accordance with the settings or positionings of the elements 14, 16, 18 and 20 both individually and in appropriate combinations, so as to provide signals apropos of such control settings or combinations thereof.

Figure 2:
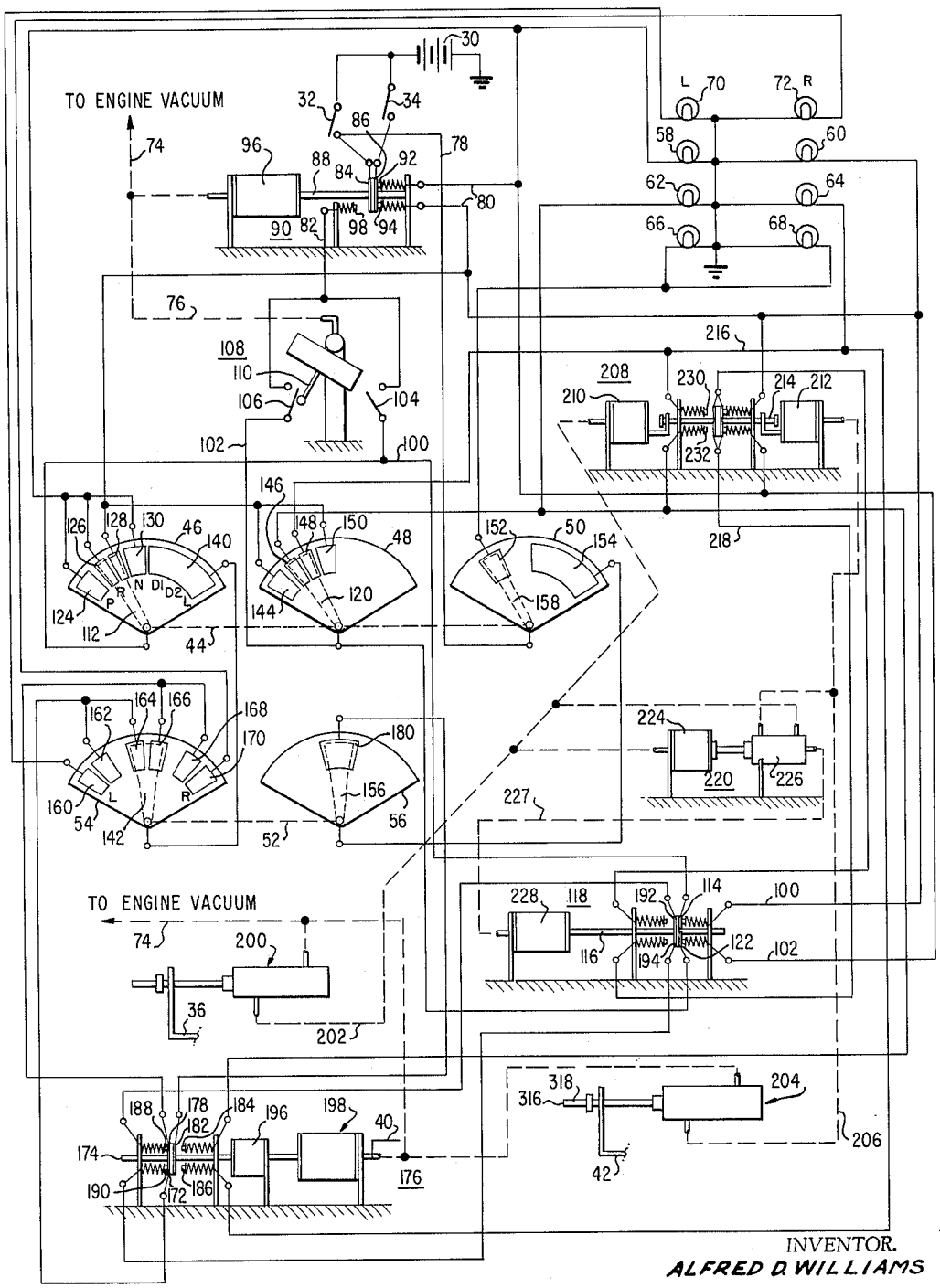
FIG. 2 is a schematic diagram of the safety light signal system of the present invention, illustrating both the electrical circuitry and the pneumatic connections of this preferred embodiment.

FIG. 2 shows in detail a preferred embodiment of the electrical circuitry and pneumatic connections of the apparatus of the present invention, as well as several components of the vehicle per se which cooperate with the elements of the present invention but do not necessarily form a part of the invention disclosed and claimed herein.

In FIG. 2, the vehicle battery or other electrical source is indicated at 30, with one terminal thereof being connected to ground or some other suitable common connection, and the other terminal being connected to both an ignition switch 32 and a headlight switch 34. Portions of the vehicle accelerator linkage are indicated at 36 and 40, and a portion of the brake linkage of the vehicle is shown at 42. The dash line 44 indicating the mechanical ganging of the rotary or pivotal arms of the several electrical switch sectors 46, 48 and 50 is also mechanically connected to and operated by the vehicle transmission or drive control (not shown in FIG. 2). Similarly, the dash line 52 indicating the ganged relationship between the movable switch contacts of switch segments 54 and 56 is connected to and operated by the vehicle turn indicator control (not shown in FIG. 2).

FIG. 2 includes the four pairs of signal lights comprising the output or signalling indication of the apparatus of the invention, the first pair bearing reference numerals 58 and 60, the second pair numerals 62 and 64, the third pair numerals 66 and 68 and the fourth pair numerals 70 and 72. Pneumatic conduits or pipes 74 and 76 are connected to an engine manifold or other suitable source of vacuum which operates concurrently with the vehicle engine (such source not being shown in FIG. 2). The remainder of the items of FIG. 2 comprise the means for interconnecting the vehicle battery 30 with the several signal lights 58 through 72 under the control of the several vehicle control means referred to above, and in the preferred embodiments shown the switching means are pneumatically operated by virtue of their connection to the aforementioned vacuum source.

As was stated above, it is desired to selectively energize the several signal lights 58 through 72 in three distinct modes, viz., (1) steady illumination, (2) bilateral flashing, wherein a pair of lights are simultaneously energized in an interrupted or flashing mode of operation and (3) alternate flashing, wherein a pair of lights are alternately energized in a repetitive manner. In general terms, steady illumination of one or more of the lights is achieved by means of circuits 78 and 80, the latter being directly connected to signal lights 58 and 60, and the former being connected to other signal lights by way of switch segments 50 and 56, as well as other circuitry which will be described. On the other hand, and again in general terms, flashing illumination of one or more of the signal lights of the invention, whether bilateral or alternate, is achieved by way of circuit 82 and the components connected thereto.

Before proceeding with a detailed description of FIG. 2, a general understanding of the nature of the present invention may be enhanced by the following listing of the major components thereof, indicating the manner of operation or actuation and, in general terms, the functional significance:

(1) Vacuum operated signal activation and parking switch
(2) Vacuum operated electrical circuit interruptor or flasher
(3) Manually operated drive selector circuit switch
(4) Manually operated turn indicator circuit switch
(5) Accelerator actuated vacuum control valve
(6) Vacuum operated motion deceleration indicator switch
(7) Vacuum operated flash circuit transfer switch
(8) Vacuum operated vacuum directional control valve
(9) Brake actuated vacuum control valve, and
(10) Vacuum operated braking and stop indicator switch.

Referring now in detail to FIG. 2, the ignition switch 32 and the headlight switch 34 connect battery 30 to respective contacts 84 and 86, which are mounted in mutually insulated relationship on the armature 88 of the signal activation and parking switch 90. Contact 86 is normally in electrical contact with contacts 92 and 94, which are respectively connected through circuit 80 to signal lights 58 and 60. It will be understood that contacts 92 and 94, as well as the remaining similar contacts in the circuit of FIG. 2, are mounted on springs or other suitable means so as to provide a resilient mount therefor, as is common in the art. A bellows 96 is connected to conduit 74 so as to be actuated by the vacuum source connected thereto to draw armature 88 toward the left in FIG. 2 to establish an electrical contact between contact 84 and relatively stationary contact 98, the latter being electrically connected to circuit 82.

Circuit 82 is connected to two separate circuits 100 and 102 through respective switch contacts 104 and 106, which form a part of the electrical circuit interruptor or flasher 108. As will be better understood in connection with the description of FIGS. 4 and 5, circuit interruptor 108 is continuously operated by means of the vacuum source connected to conduit 76 and serves to continuously alternate the voltage present on circuit 82 between circuits 100 and 102. That is to say, as the armature 110 of circuit interruptor 108 alternates in position between that shown in FIG. 2 and a corresponding position toward the right in that figure, normally open switches 106 and 104 are closed, respectively, to connect circuit 82 to circuits 102 and 100 in repetitive alternation.

Circuit 100 is connected to the contact or wiper arm 112 of switch segment 46, as well as to the upper contact 114 on armature 116 of braking and stop indicator switch 118, which will be further described in connection with FIG. 10. Similarly, circuit 102 is connected to rotary contact arm 120 of switch segment 48, as well as to the lower contact 122 of the armature 116 in switch 118. Thus, one series of spaced voltage pulses is applied simultaneously to the rotary contact 112 of switch segment 46 and to the upper movable contact 114 on armature 116; correspondingly, an alternate series of spaced voltage pulses is simultaneously applied to movable contact 120 on switch segment 48 and to lower contact 122 on armature 116. To express this thought in still different terms, the action of circuit interruptor 108 is such as to apply voltage pulses to rotary contacts 112 and 120 in repetitive alternation, as well as to apply similar pulses to contacts 114 and 122 in repetitive alternation.

Switch segment 46 includes a plurality of switch contacts 124 through 140 which are adapted to be contacted by movable contact 112 in a selective manner governed by the positioning of the transmission or drive selector switch of the vehicle. Contact 124 corresponds to the PARK position, contacts 126 and 128 together correspond to the REVERSE position, contact 130 corresponds to the NEUTRAL position and contact 140 corresponds to the three forward drive positions, D1, D2 and L. Contacts 124, 126 and 130 are all connected to signal light 58, while contact 128 is connected to signal light 60. Contact 140 is connected to the wiper arm 142 of switch segment 54 of the turn indicator switch assembly. Similarly, the drive control switch segment 48 includes stationary contacts 144, 146, 148 and 150, with contact 144 corresponding to the PARK position, contacts 146 and 148 corresponding to the REVERSE position and contact 150 corresponding to the NEUTRAL position. Contacts 144 and 150 are connected to signal light 60, while contacts 146 and 148 are connected, respectively, to signal lamps 62 and 64. Drive selector switch segment 50 includes only two stationary contacts, viz., REVERSE contact 152 and the longer contact 154 which corresponds to the three forward drive positions of the transmission selector control. Contact 152 is connected to both signal lamps 66 and 68, while contact 154 is connected to wiper arm 156 of switch segment 56 in the turn indicator switch. As may be seen, wiper arm 158 of switch segment 50 is connected to circuit 76, which, as was stated above, supplies a steady voltage upon the closing of the ignition switch 32.

By virtue of the circuit connections thus afforded by the several switches 46, 48 and 50 under the control of the transmission selector of the vehicle, the several signal lights will be energized in the following manner for each of the several positions of the transmission or drive control:

(1) In the PARK position, the voltage pulses which are alternately applied to contact arm 112 and contact arm 120 are applied through respective contacts 124 and 144 to red lights 58 and 60, respectively, to provide an alternate right and left flashnig red signal.

(2) In the REVERSE position, the voltage pulses on circuit 100 are applied simultaneously to red lights 58 and 60, while the alternate pulses in circuit 102 are applied simultaneously to amber lights 62 and 64, thus providing alternate right and left bilateral red and amber flashing of these lights, along with steady illumination of white back-up lights 66 and 68 by virtue of the connection of circuit 78 thereto through wiper arm 158 and stationary contact 152.

(3) In the NEUTRAL position, the voltage pulses on circuits 100 and 102 are applied through contacts 130 and 150, respectively, to red lights 58 and 60, to provide an alternating flashing red signal.

(4) In any of the forward drive positions (D1, D2 or L), the interrupted or pulsating voltage on circuit 100 is applied to the wiper arm 142 of switch segment 54, and the steady or constant voltage on circuit 78 is applied to wiper arm 156 of switch segment 56.

Referring now to the two switch segments 54 and 56 of the turn indicator control, it will be seen that switch segment 54 includes a plurality of stationary contacts 160, 162, 164, 166, 168 and 170, each of which is adapted to be contacted by wiper arm 142. Contacts 160 and 170 are connected, respectively, to red signal lights 70 and 72, while contacts 162 and 164 are connected together and to the lower contact 172 on armature 174 of motion deceleration indicator 176. Similarly, contacts 166 and 168 are connected together and to upper armature contact 178 of switch 176. Switch segment 56 includes one stationary contact 180, which is connected to a third armature contact 182 of motion deceleration indicator or switch 176.

Thus, the pulsating voltage applied to wiper arm 142 is applied to either red light 70 or red light 72, depending upon whether wiper arm 142 is in the left hand turn position or the right hand turn position. When this wiper arm is in the left turn position, the pulsating voltage is also made available at contact 172, whereas when the wiper arm 142 is in the right turn position, this pulsating voltage is applied to armature contact 178. In the neutral or straight-ahead position of the wiper arm 142, the pulsating voltage thereon is applied simultaneously to the armature contacts 172 and 178. Also, in the straight-ahead position of the turn indicator control the wiper arm 156 is in contact with stationary contact 180 to apply the steady voltage applied to wiper arm 156 to the third armature contact 182 of switch 176.

To complete the description of FIG. 2, a brief description of the pneumatically operated devices will be made, with more detailed information as to such devices being supplied in connection with the description of the subsequent figures of the drawings. The motion deceleration indicator 176 includes (in addition to the elements set forth above) a pair of relatively stationary contacts 184 and 186 which are connected, respectively, to amber lights 62 and 64. A second pair of relatively stationary contacts 188 and 190 are connected, respectively to a pair of armature contacts 192 and 194 in the braking and stop indicator switch 118. A bellows 196 is provided for operating the armature 174 so as to make contact between armature contact 178 and stationary contact 188, and between armature contact 172 and stationary contact 190, when the armature 174 is in the position shown in FIG. 2, while providing a contact between armature contact 182 and both contacts 184 and 186 when the armature 174 is moved to the right in FIG. 2 by means of the bellows 196. Bellows 196, in turn, is operated under the influence of a combined bellows assembly 198 the operation of which is governed by the position of accelerator linkage 40, as well be described in connection with FIG. 6. Pneumatic actuation of the bellows 196 and 198 is provided by means of connection through conduit 74 to the aforementioned vacuum source.

Accelerator vacuum control valve 200 is also connected to conduit 74, and is actuated in response to movement of the accelerator control linkage 36 so as to connect conduit 202 to the vacuum source through conduit 74 when the accelerator is advanced (to achieve acceleration of the vehicle), and to admit atmospheric pressure into conduit 202 when the accelerator is retarded (as in deceleration of the vehicle). The details of the mechanism affording this action are disclosed in FIG. 7.

A brake vacuum control valve 204 is connected to and operated by a brake linkage 42 to connect conduit 206 to vacuum conduit 74 when the brake is advanced (as in braking the vehicle), and to connect the conduit 206 to atmospheric pressure when the brake is in the retarded or normal position.

Thus, conduits 202 and 206 will each have either atmospheric pressure or a vacuum present therein. When the accelerator is advanced, conduit 202 will have a vacuum applied thereto, with conduit 206 normally being supplied with atmospheric pressure, and when the brake is advanced, conduit 206 will be subjected to a vacuum, with conduit 202 normally then receiving atmospheric pressure.

Flash circuit transfer switch 208 is a two-position switch, with respective bellows means 210 and 212 being provided for actuating the armature 214 into a respective one of the two positions. As may be seen, bellows 210 is connected to conduit 202, whereas bellows 212 is connected to conduit 206. Obviously, a vacuum in conduit 202 will cause contraction of bellows 210, drawing armature 214 toward the left in FIG. 2, and a vacuum in conduit 206 will provide an opposite result. With the armature 214 in its right-hand position as shown in FIG. 2, circuits 216 and 218 are connected, respectively, to red lights 60 and 58, whereas when armature 214 is moved to the opposite or left position, circuits 216 and 218 are connected, respectively to amber lights 64 and 62.

Vacuum directional control valve 220 includes a bellows 224 which is connected to conduit 202 so as to be contracted by the vacuum present in the conduit when the accelerator is advanced, and to be expanded by atmospheric pressure when the accelerator is retarded. As will be seen in connection with FIG. 9, this expansion and contraction of bellows 224 operates a valve within housing 226 which permits connection of either accelerator conduit 202 or brake conduit 206 to the bellows 228 of braking and stop indicator switch 118.

In general, the operation of the vacuum actuated devices of FIG. 2 is such that when the accelerator is advanced, the armature 174 is moved to the right to connect the steady voltage available at wiper arm 156 (assuming the vehicle to be accelerating and not turning) to both amber lights 62 and 64 through contacts 184 and 186. Further, the advancement of the accelerator provides a vacuum in conduit 202, resulting in movement of the armature 214 to the left, as well as a similar movement of armature 116 upon the application of the vacuum to bellows 228 through the housing 226.

When the accelerator is then retarded, the armature 174 immediately moves to the left position, disconnecting the steady source of energization for the amber lights 62 and 64 and applying to such lights a bilateral or simultaneous flashing signal which may be traced from wiper arm 142 through contacts 188 and 190, contacts 192 and 194, circuits 216 and 218 and the respective stationary contacts 230 and 232.

When the brakes are applied, the flash circuit transfer switch 208 is operated toward the right to the position shown in FIG. 2, and the bilateral flashing signals on circuits 216 and 218 are then applied to red lights 60 and 58, respectively.

If the brakes are now released, and the accelerator remains in the retarded position, the bellows 228 is allowed to expand, moving armature 116 toward the right in FIG. 2. As a result, the energization of circuits 216 and 218 is interrupted, and an alternating flashing energization of red lights 58 and 60 is provided through contacts 114 and 122 and the alternately energized circuits 100 and 102.

FIG. 3 shows signal activation and parking switch 90 in somewhat greater detail, including bellows 96 which is mounted at one end on some suitable stationary support 234 so as to be able to drive armature 88 toward the right upon expansion, and to draw the armature toward the left upon contraction as a result of the application of a vacuum from conduit 74 whenever the vehicle engine is in operation. A suitable bushing or bearing 236 is provided to permit easy movement of the armature 88 is establishing circuits alternately between armature contact 84 and stationary contact 98 and armature contact 86 and stationary contacts 92 and 94 as described above.

Figure 4:
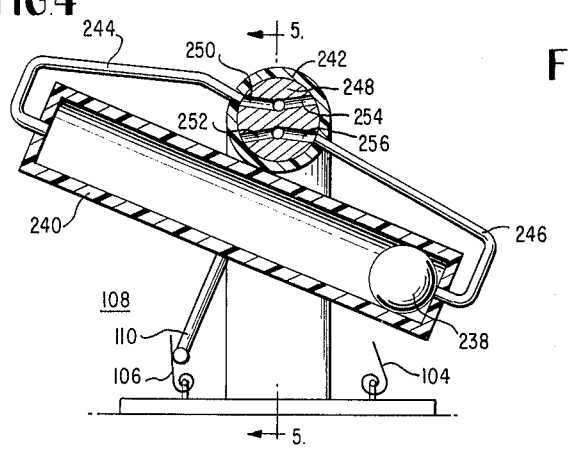
FIGS. 4 and 5 are vertical section views, taken on mutually perpendicular respective central planes, of the electrical circuit interruptor or flasher shown in FIG. 2.
Figure 5:
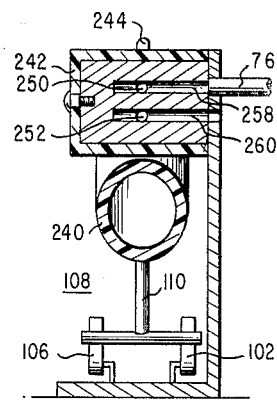

The details of the construction of the electrical circuit interruptor or flasher 108 are shown in FIGS. 4 and 5. Circuit interruptor 108 is a simple vacuum-activated engine consisting of a polished ball 238 within a cylinder 240 the opposite ends of which are connected to a rotary cylinder 242 by means of tubes 244 and 246, respectively. In this manner, the cylinder 240 is supported by the rotary cylinder 242 for limited pivotal movement upon rotation of cylinder 242 through approximately 45 degrees, and the interior of cylinder 240 is in communication with the interior of cylinder 242.

Rotary cylinder 242 is mounted for rotation around a central hub 248, which includes transverse ports 250, 252, 254 and 256 and longitudinal ports 258 and 260. Longitudinal port 258 is connected to the vacuum supply through conduit 76, and longitudinal port 260 is opened to atmospheric pressure. As may be seen in FIGS. 4 and 5, port 258 is connected to transverse ports 250 and 254, while port 260 is connected to transverse ports 252 and 256. In this manner, the vacuum present in port 258 may be applied to the left end of cylinder 240 by way of port 250 and tube 244, while atmospheric pressure is supplied to the right end of cylinder 240 by way of ports 260 and 256 and tube 246, with cylinders 240 and 242 in the position shown in FIG. 4. At the other extreme of the pivotal travel of cylinder 240 tube 244 is aligned with port 252, and tube 246 is aligned with port 254, thereby reversing the connections and applying vacuum to the right end of cylinder 240 and atmospheric pressure to the left end thereof.

The operation of circuit interruptor 108 as shown in FIGS. 4 and 5 is now obvious, since with the parts in the position illustrated in FIG. 4 the combined effect of a vacuum in tube 244 and atmospheric pressure in tube 246 will drive the ball 238 toward the left end of cylinder 240, eventually resulting in a counterclockwise movement of cylinders 240 and 242 to the other limit of their travel, by virtue of the action of gravity on the ball 238. Thereupon the vacuum and atmospheric pressure connections are reversed and the ball 238 is driven back in the opposite direction to return the parts to the position shown in FIG. 4. At each limiting position of the pivotal travel of cylinder 240 the armature member 110 bears against the respective switch member 104 or 106 to complete the electrical circuits connected thereto as shown in FIG. 2.

In the construction of the circuit interruptor 108, the ball 238 is preferably a polished steel ball, and cylinders 240 and 242 are preferably fabricated of nylon. Obviously, the relative dimensions of elements 238 and 240 and elements 242 and 248 must be such as to provide a sufficiently close fit to prevent the loss of the respective pressures involved.

Since longitudinal port 258 is connected to the vehicle engine vacuum supply through conduit 76, the operation of circuit interruptor 108 is continuous and self-cycling whenever the vehicle engine is operating. The speed of the interruptor is determined by the size of the steel ball, the length of cylinder 240 and the degree of vacuum supplied thereto. Also, it will be obvious that the particular structure of the switches 104 and 106 may be varied, and the tilting motion of cylinder 240 suggests, for example, the use of a mercury switch, if desired. As is apparent, the length of the signal light flash obtained from this circuit interruptor may be determined by suitable adjustment of the interval of closure of the respective circuit contacts.

As will be apparent to those skilled in the art, the operation of circuit interruptor 108 results in an interrupted intake of air at conduit 260, thus providing a suitable source for energizing an audible signal or other suitable pneumatically operated device, if desired.

Motion deceleration switch 176 (FIG. 6) has three bellows 196, 262 and 264, the latter two having previously been referred to by the reference numeral 198 in FIG. 2, along with a movable pressure control tube 266 which is activated by movement of the accelerator.

Bellows 262 is connected at one end by a tube 268 to bellows 196, and at the other end a sleeve 270 (preferably of nylon) is provided for cooperation with the pressure control tube 266, the latter being pneumatically connected to the vacuum conduit 74 and mechanically connected to accelerator linkage 40, as was stated in connection with the description of FIG. 2.

Referring to FIGS. 6 and 6A together, it may be seen that the distal end of pressure control tube 266 is divided into top and bottom portions by a partition 272. The top half is sealed at its proximal end 274, and a small port 276 is provided in the lateral wall nearby such that when the pressure control tube 266 is retracted from bellows 262, port 276 is outside nylon sleeve 270 and air is introduced into bellows 262, allowing the latter to expand from any position of contraction caused by the introduction of a vacuum within the bellows. The bottom portion of tube 266 is sealed at the distal end 278, and a small port 280 is provided near such end so that when the tube 266 is advanced into bellows 262 the negative pressure of the vacuum in conduit 74 is introduced into the bellows, lowering the pressure in both bellows 262 and 196 and causing both to contract.

By virtue of the spacing between ports 276 and 280 relative to the length of nylon sleeve 270, bellows 262 and 196 will contract or expand as a result of relative movement between pressure control tube 266 and the sleeve 270. In short, the contraction and expansion of bellows 262 and 196 closely monitors the position of the pressure control tube 266 as it is advanced or retarded by the accelerator linkage 40.

Bellows 264 is relatively large and encloses bellows 266, with the two having common end portions except for a small port 282 communicating between the interior of bellows 264 alone and atmospheric pressure. While bellows 262 and 264 are constrained to move together in expansion or contraction, the result is that the otherwise immediate contraction or expansion of bellows 262 (in response to movement of pressure control tube 266 relative to sleeve 270) is modulated or delayed in time by the action of bellows 264 as the air passes through the restricted orifice of port 282. Thus, when the pressure control tube 266 is advanced into bellows 262 (as a result of the advancement of the vehicle accelerator), a vacuum is applied to both bellows 262 and 196. Bellows 196 contracts immediately, closing the contact 182 against stationary contacts 184 and 186 and lighting a constant bilateral amber signal as was described in connection with FIG. 2; bellows 262 contracts, but under the modulating or delaying effect of bellows 264, until sleeve 270 closes vacuum port 280.

When the vehicle accelerator is then retarded, pressure control tube 266 is retracted from sleeve 270, and atmospheric pressure is introduced into bellows 262 through port 276 and the upper half of the distal end of control tube 266. Bellows 196 responds immediately to this change in pressure, and upon expanding it opens the circuits made by contact 182, closing the circuits connected to the contacts 178 and 188 and contacts 172 and 190, providing a flashing bilateral amber signal. Again, bellows 262 expands under the influence of bellows 264 until the sleeve 270 closes ports 276. In the preferred form, pressure control tube 266 is attached to the vehicle accelerator by a lever linkage, so that the pressure control tube moves a distance several times the excursion of the vehicle accelerator pedal.

Figure 7:
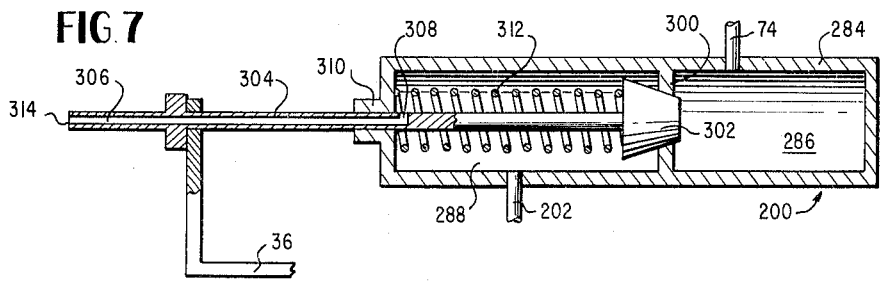
FIG. 7 is a vertical section view of the accelerator vacuum control valve of FIG. 2.

The accelerator-activated vacuum control valve 200, shown in detail in FIG. 7, includes a cylindrical housing 284 which is divided into two coaxial chambers 286 and 288 by a valve seat 300. The cooperating valve 302 is frusto-conical in shape, being formed of rubber or some other suitable resilient valve material, and is mounted on a valve stem 304, the distal end of which has a hollow central bore 306 connecting a port 308 to atmospheric pressure. Valve stem 304 extends into chamber 288 through a close-fitting sleeve or bushing 310 which forms a substantially air-tight sliding contact with the valve stem 304. Where the cylindrical housing 284 is fabricated of nylon or the like, the sleeve 210 will also normally be nylon and will thus provide this desired close sliding fit with the valve stem.

Valve 302 is normally held in the closed position by means of a helical spring 312, and in this position atmospheric pressure in bore 306 is permitted to enter chamber 288 by means of port 308, resulting in the application of atmospheric pressure to conduit or pipe 202, as was described in connection with FIG. 2, to allow the expansion of bellows 210 and 224. When, on the other hand, the vehicle accelerator is advanced, resulting in movement of the accelerator linkage 36 to the left in FIG. 7, valve 302 is also moved to the left so as to unseat it and permit a vacuum to be drawn in conduit or pipe 202 through valve seat 300 and conduit 74, the latter being connected to the vehicle vacuum source. Accordingly, this advancement of the vehicle accelerator results in the contraction of bellows 210 and 224 (see FIG. 2), with concomitant contraction of bellows 228 as a result of the valving action of vacuum directional control valve 220.

Figure 8:
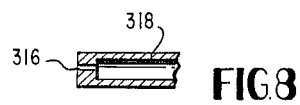
FIG. 8 is a vertical section view of a portion of the brake vacuum control valve shown in FIG. 2.

Brake vacuum control valve 204 shown in FIG. 2 is identical in structure to accelerator vacuum control valve 200 just described, except for the formation of the distal end of the valve stem therein. The bore 306 of valve stem 304 of accelerator control valve 200 is open to atmospheric pressure at a port 314 which is as large as the cross section of the bore itself. In sharp contrast, the air port 316 in the distal end of the valve stem 318 of brake vacuum control valve 204 is a small orifice, as shown in FIG. 8.

Referring briefly again now to FIG. 2, it will be appreciated that when the vehicle brake is not advanced, the position of the brake linkage 42 is such that the brake vacuum control valve is closed (in a manner analogous to the normal closing of the accelerator vacuum control valve, FIG. 7), and the air port 316 is thus connected with pipe or conduit 206. When the brake is advanced, so as to break the motion of the vehicle, brake linkage 42 moves to the left in FIG. 2, carrying valve stem 318 in the same direction and thereby opening the brake vacuum valve (not shown) to apply the vacuum in conduit 74 to the pipe 206 to cause contraction of bellows 212 and, depending upon the position of the vacuum directional control valve 220, bellows 228.

FIG. 9 shows the vacuum directional control valve 220 in detail, and as was previously stated, this valve is operated by the pressure (vacuum or atmospheric) applied to conduit 202 by accelerator control valve 200, and serves to connect (by way of conduit 227) bellows 228 of braking and stop indicator switch 118 to either the output conduit 202 of the accelerator control valve or to the output line 206 of the brake control valve. The purpose of the vacuum directional control valve is to divide the vacuum circuit of the accelerator system from that of the braking system, so that the bellows in one system are not activated by vacuum in the other system, and so that air can be bled into one of these systems without affecting the other.

Vacuum directional control valve 220 includes a cylindrical housing 228 which is divided into two chambers 320 and 322 by a transverse valve seat 324 which cooperates with a valve member 326 carried by a valve stem 328 which is attached to the movable end of bellows 224. A helical spring 330 or the like is employed to hold the valve normally open, thus normally interconnecting braking control valve output line 206 with conduit 227 leading to bellows 228 in braking and stop indicator switch 118. When the vehicle accelerator is advanced and the resulting vacuum is applied to bellows 224 through line 202, the bellows 224 contracts and the valve member 326 is seated in valve seat 324, interrupting the connection between lines 206 and 227. Line 227 is now in communication with line 202 by way of the spring-biased ball valve 332, which permits a vacuum to be drawn in chamber 320 by means of line 202, but which prohibits the bleeding of air in line 202 (when the accelerator is retarded) into the line 227 and bellows 228.

The details of the structure of the braking and stop indicator switch 118 are shown in FIG. 10. This switch is operated by bellows 228, which, when contracted, causes contacts 192 and 194 to close against left contacts 334 and 336, respectively, which are, in turn, respectively connected to circuits 216 and 218 to provide a bilateral flashing red light signal when braking, and a bilateral flashing amber when decelerating. In the expanded condition of bellows 228, contacts 114 and 122 close against respective stationary contacts 338 and 340, to connect the alternate flashing pulses on circuits 100 and 102 to red lights 60 and 58, respectively.

As was previously explained, bellows 228 is contracted by a vacuum in either the accelerator or braking systems through vacuum directional control valve 220. Thus, bellows 228 contracts when either the brake or accelerator is depressed or advanced. On the other hand, bellows 228 expands as a result of the air that is bled into the braking system, when neither the accelerator or brake is advanced. As was also previously stated, the rate of expansion of bellows 228 is determined by the size of the orifice 316 in the braking control valve stem, so that bellows 228 will expand at a pre-determined time subsequent to the application and release of the vehicle brake, assuming the accelerator not to have been advanced in the meantime. As a result, a bilateral flashing red signal indicating rapid deceleration or braking will change into an alternate flashing red signal, indicating that the vehicle is stationary.

Flash circuit transfer switch 208 is shown in detail in FIG. 11, including the previously described bellows 210 and 212, each acting to draw the armature 214 in its direction by means of respective arms 342 and 344. Since each of these arms engages the armature 214 in a loose manner except for the abutment of the arms against the respective heads 346 and 348 on the armature 214, the armature is moved only upon contraction of either bellows. As bellows 210 contracts in response to the advancement of the vehicle accelerator, the associated arm 342 draws the armature 214 toward the left in FIG. 11, closing the circuits connected to stationary contacts 230 and 232 and contacts 350 and 352, respectively. When, on the other hand, bellows 212 contracts in response to the brake pedal being advanced, armature 214 is drawn to the right, closing the circuits connected to contact pairs 354–356 and 358–360. In the former instance, a flashing amber signal is provided, while in the latter a flashing red is given.

A detent spring 362 is provided to hold the armature 214 in a given position until the opposite bellows is contracted to draw the armature into the other position. It will be appreciated that, as shown in FIG. 2, circuit 216 is connected to both contacts 350 and 354, while circuit 218 is similarly connected to both contacts 352 and 358.

FIGS. 12 and 13 show two types of contact faces employed in the switch devices of the present invention, with the contact of FIG. 12 comprising two electrically separated and insulated contact portions 364 and 366 for closing two separate circuits upon the movement of a given armature. The contact of FIG. 13, on the other hand, is one continuous contact member 368, which may be employed where only one circuit is connected to the movable or armature contact, and where such single circuit is to be connected to either one or more circuits attached to the associated stationary contacts.

The invention has been described above in considerable detail, and with particular reference to its application to a vacuum or pneumatically operated safety signal light system for use on automobiles. However, as will be apparent to those skilled in the art, the several switching mechanisms disclosed herein may be operated in some other suitable manner, and the inventive concept is not necessarily limited to use on automobiles or even vehicles employing internal combustion engines. Hence, the invention is not to be considered as limited to the particular details given, nor to the specific application disclosed, except insofar as may be required by the scope of the appended claims.

What is claimed is:

1. An attitude-indicating safety light signal system for vehicles of the type having an engine, an accelerator linkage, a brake linkage, a transmission control, a right and left turn indicator control, and a voltage source having an ignition switch and a headlight switch connected thereto in separate circuits, comprising: four pairs of electrical signal lights, the members of each said pair being adapted to be mounted adjacent respectively opposite sides of a vehicle so as to be generally visible from the rear thereof; means normally connecting such headlight switch to a first of said pairs of signal lights and operable in response to the operation of such engine to disconnect such light switch from said first pair of lights and to connect such ignition switch to a first circuit; means operable in response to the operation of such engine to connect said first circuit to second and third circuits in repetitive alternations; means connected to and operable by such transmission control to establish the following electrical connections: in the PARK position, said second circuit to a first light of said first pair of signal lights, and said third circuit to the second light of said first pair of signal lights, in the REVERSE position, said second circuit to both of the lights of said first pair of signal lights, said third circuit to both of the lights of a second pair of said signal lights, and said ignition switch to both of the lights of a third pair of said signal lights, in the NEUTRAL position, said second circuit to said first light of said first pair of signal lights, and said third circuit to said second light of said first pair of signal lights, and in any of the forward DRIVE positions, said second circuit to a fourth circuit, and such ignition switch to a fifth circuit, means connected to and operable by such turn indicator control to establish the following electrical connections: in the LEFT and TURN position, said fourth circuit to a first light of the fourth pair of said signal lights and to a sixth circuit, in the RIGHT and TURN position, said fourth circuit to the second light of said fourth pair of signal lights and to a seventh circuit and in the NEUTRAL position, said fourth circuit to both said sixth and seventh circuits, and said fifth circuit to an eight circuit, means connected to and operable by such accelerator linkage to connect said sixth and seventh circuits to ninth and tenth circuits, respectively, only when the accelerator is retarted, and to connect said eighth circuit to both of the lights of said second pair of signal lights only when the accelerator is advanced; means normally connecting said third circuit to said first light of said first pair of signal lights and said second circuit to said second light of said pair but operable in response to the advancement of either the accelerator or brake of such vehicle to disconnect said second and third circuits from said first pair of signal lights and to connect said ninth and tenth circuits to eleventh and twelfth circuits, respectively, and means connected to both such accelerator and braking linkages for connecting said eleventh and twelfth circuits to the first and second lights of said second pair of signal lights, respectively, when the accelerator is advanced, and for connecting said eleventh and twelfth circuits to the first and second lights of said first pair of signal lights, respectively, when the brake is advanced.

2. An attitude-indicating safety light signal system in accordance with claim 1, wherein said first lights of the several pairs of signal lights are adapted to be mounted adjacent the left side of such vehicle.

3. An attitude-indicating safety light signal system in accordance with claim 1, wherein the lights of said first pair of signal lights are red brake lights, the lights of said second pair are amber running lights, the lights of said third pair are white back-up lights and the lights of said fourth pair are red turn lights.

4. An attitude-indicating safety light signal system for vehicles of the type having a vacuum source which operates concurrently with the vehicle engine, an accelerator linkage, a brake linkage, a transmission control, a right and left turn indicator control, and a voltage source having an ignition switch and a headlight switch connected thereto in separate circuits, comprising: four pairs of electrical signal lights, the members of each said pair being adapted to be mounted adjacent respectively opposite sides of a vehicle so as to be generally visible from the rear thereof; means normally connecting such headlight switch to a first of said pairs of signal lights and operable by such vacuum source to disconnect such light switch from said first pair of lights and to connect such ignition switch to a first circuit; means connected to such vacuum source and operable thereby to connect said first circuit to second and third circuits in repetitive alternation; means connected to and operable by such transmission control to establish the following electrical connections: in the PARK position, said second circuit to a first light of said first pair of signal lights, and said third circuit to the second light of said first pair of signal lights, in the REVERSE position, said second circuit to both of the lights of said first pair of signal lights, said third circuit to both of the lights of a second pair of said signal lights, and said ignition switch to both of the lights of a third pair of said signal lights, in the NEUTRAL position, said second circuit to said first light of said first pair of signal lights, and said third circuit to said second light of said first pair of signal lights, and in any of the forward DRIVE positions, said second circuit to a fourth circuit, and such ignition switch to a fifth circuit; means connected to and operable by such turn indicator control to establish the following electrical connections: in the LEFT-TURN position, said fourth circuit to a first light of the fourth pair of said signal lights and to a sixth circuit, in the RIGHT-TURN position, said fourth circuit to the second light of said fourth pair of signal lights and to a seventh circuit, and in the NEUTRAL position, said fourth circuit to both said sixth and seventh circuits, and said fifth circuit to an eighth circuit; means connected to and operable by such accelerator linkage to connect said sixth and seventh circuits to ninth and tenth circuits, respectively, only when the accelerator is retarded, and to connect said eighth circuit to both of the lights of said second pair of signal lights only when the accelerator is advanced; means normally connecting said third circuit to said first light of said first pair of signal lights and said second circuit to said second light of said first pair but operable in response to the advancement of either the accelerator or brake of such vehicle to disconnect said second and third circuits from said first pair of signal lights and to connect said ninth and tenth circuits to eleventh and twelfth circuits, respectively, and means connected to both such accelerator and braking linkages for connecting said eleventh and twelfth circuits to the first and second lights of said second pair of signal lights, respectively, when the accelerator is advanced, and for connecting said eleventh and twelfth circuits to the first and second lights of said first pair of signal lights, respectively, when the brake is advanced.

5. An attitude-indicating safety light signal system in accordance with claim 4, wherein said first lights of the several pairs of signal lights are adapted to be mounted adjacent the left side of such vehicle.

6. An attitude-indicating safety light signal system in accordance with claim 4, wherein the lights of said first pair of signal lights are red brake lights, the lights of said second pair are amber running lights, the lights of said third pair are white back-up lights and the lights of said fourth pair are red turn lights.

7. An attitude-indicating safety light signal system for vehicles of the type having a vacuum source which operates concurrently with the vehicle engine, an accelerator linkage, a brake linkage, a transmission control, a right and left turn indicator control, and a voltage source having an ignition switch and a headlight switch connected thereto in separate circuits, comprising: four pairs of electrical signal lights, the members of each said pair being adapted to be mounted adjacent respectively opposite sides of a vehicle so as to be generally visible from the rear therof; means normally connecting such headlight switch to a first of said pairs of signal lights and operable by such vacuum source to disconnect such light switch from said first pair of lights and to connect such ignition switch to a first circuit; means connected to such vacuum source and operable thereby to connect said first circuit to second and third circuits in repetitive alternation; means connected to and operable by such transmission control to establish the following electrical connections: in the PARK position, said second circuit to a first light of said first pair of signal lights, and said third circuit to the second light of said first pair of signal lights, in the REVERSE position, said second circuit to both of the lights of said first pair of signal lights, said third circuit to both of the lights of a second pair of said signal lights, and said ignition switch to both of the lights of a third pair of said signal lights, in the NEUTRAL position, said second circuit to said first light of said first pair of signal lights, and said third circuit to said second light of said first pair of signal lights, and in any of the forward DRIVE positions, said second circuit to a fourth circuit, and such ignition switch to a fifth circuit; means connected to and operable by such turn indicator control to establish the following electrical connections: in the LEFT-TURN position, said fourth circuit to a first light of the fourth pair of said signal lights and to a sixth circuit, in the RIGHT-TURN position, said fourth circuit to the second light of said fourth pair of signal lights and to a seventh circuit, and in the NEUTRAL position, said fourth circuit to both said sixth and seventh circuits, and said fifth circuit to an eighth circuit; pneumatically actuated means connected to such vacuum source and operable by such accelerator linkage to connect said sixth and seventh circuits to ninth and tenth circuits, respectively, only when the accelerator is retarded, and to connect said eighth circuit to both of the lights of said second pair of signal lights only when the accelerator is advanced; pneumatically actuated means connected to such vacuum source normally connecting said third circuit to said first light of said first pair of signal lights and said second circuit to said second light of said first pair but operable in response to the advancement of either the accelerator or brake of such vehicle to disconnect said second and third circuits from said first pair of signal lights and to connect said ninth and tenth circuits to eleventh and twelfth circuits, respectively, and pneumatically actuated means connected to such vacuum source and operable by both such accelerator and braking linkages for connecting said eleventh and twelfth circuits to the first and second lights of said second pair of signal lights, respectively, when the accelerator is advanced, and for connecting said eleventh and twelfth circuits to the first and second lights of said first pair of signal lights, respectively, when the brake is advanced.

8. An attitude-indicating safety light signal system in accordance with claim 7, wherein said first lights of the several pairs of signal lights are adapted to be mounted adjacent the left side of such vehicles.

9. An attitude-indicating safety light signal system in accordance with claim 7, wherein the lights of said first pair of signal lights are red brake lights, the lights of said second pair are amber running lights, the lights of said third pair are white back-up lights and the lights of said fourth pair are red turn lights.

10. An attitude-indicating safety light signal system for vehicles of the type having an engine, as accelerator linkage, a brake linkage, a transmission control and a voltage source having an ignition switch and a headlight switch connected thereto in separate circuits, comprising: three pairs of electrical signal lights, the members of each said pair being adapted to be mounted adjacent respectively opposite sides of a vehicle so as to be generally visible from the rear thereof; means normally connecting such headlight switch to a first of said pairs of signal lights and operable in response to the operation of such engine to disconnect such light switch from said first pair of lights and to connect such ignition switch to a first circuit; means operable in response to the operation of such engine to connect said first circuit to second and third circuits in repetitive alternation; means connected to and operable by such transmission control to establish the following electrical connections: in the PARK position, said second circuit to a first light of said first pair of signal lights, and said third circuit to the second light of said first pair of signal lights, in the REVERSE position, said second circuit to both of the lights of said first pair of signal lights, said third circuit to both of the lights of a second pair of said signal lights, and said ignition switch to both of the lights of a third pair of said signal lights, in the NEUTRAL position, said second circuit to said first light of said first pair of signal lights, and said third circuit to said second light of said first pair of signal lights, and in any of the forward DRIVE positions, said second circuit to a fourth circuit, and such ignition switch to a fifth circuit; means connected to and operable by such accelerator linkage to connect said fourth circuit to sixth and seventh circuits only when the accelerator is retarded, and to connect said fifth circuit to both of the lights of said second pair of signal lights only when the accelerator is advanced; means normally connecting said third circuit to said first light of said first pair of signal lights and said second circuit to said second light of said first pair but operable in response to the advancement of either the accelerator or brake of such vechicle to disconnect said second and third circuits from said first pair of signal lights and to connect said sixth and seventh circuits to eighth and ninth circuits, respectively, and means connected to both such accelerator and braking linkages for connecting said eighth and ninth circuits to the first and second lights of said second pair of signal lights, respectively, when the accelerator is advanced, and for connecting said eighth and ninth circuits to the first and second lights of said first pair of signal lights, respectively, when the brake is advanced.

11. An attitude-indicating safety light signal system in accordance with claim 10, wherein said first lights of the several pairs of signal lights are adapted to be mounted adjacent to the left side of such vehicle.

12. An attitude-indicating safety light signal system in accordance with claim 10, wherein the lights of said first pair of signal lights are red brake lights, the lights of said second pair are amber running lights and the lights of said third pair are white back-up lights.

13. An attitude-indicating safety light signal system for vehicles of the type having a vacuum source which operates concurrently with the vehicle engine, an accelerator linkage, a brake linkage, a transmission control and a voltage source having an ignition switch and a headlight switch connected thereto in separate circuits, comprising: three pairs of electrical signal lights, the members of each said pair being adapted to be mounted adjacent respectively opposite sides of a vehicle so as to be generally visible from the rear thereof; means normally connecting such headlight switch to a first of said pairs of signal lights and operable by such vacuum source to disconnect such light switch from said first pair of lights and to connect such ignition switch to a first circuit; means connected to such vacuum source and operable thereby to connect said first circuit to second and third circuits in repetitive alternation; means connected to and operable by such transmission control to establish the following electrical connections: in the PARK position, said second circuit to a first light of said first pair of signal lights, and said third circuit to the second light of said first pair of signal lights, in the REVERSE position, and second circuit to both of the lights of said first pair of signal lights, said third circuit to both of the lights of a second pair of said signal lights, and said ingition switch to both of the lights of a third pair of said signal lights, in the NEUTRAL position, said second circuit to said first light of said first pair of signal lights, and said third circuit to said second light of said first pair of signal lights, and in any of the forward DRIVE positions, said second circuit to the fourth circuit, and such ignition switch to a fifth circuit; means connected to and operable by such accelerator linkage to connect said fourth circuit to sixth and seventh circuits only when the accelerator is retarded, and to connect said fifth circuit to both of the lights of said second pair of signal lights only when the accelerator is advanced; means normally connecting said third circuit to said first light of said first pair of signal lights and said second circuit to said second light of said first pair but operable in response to the advancement of either the accelerator or brake of such vehicle to disconnect said second and third circuits from said first pair of signal lights and to connect said sixth and seventh circuits to eighth and ninth circuits, respectively, and means connected to both such accelerator and braking linkages for connecting said eighth and ninth circuits to the first and second lights of said second pair of signal lights, respectively, when the accelerator is advanced, and for connecting said eighth and ninth circuits to the first and second lights of said first pair of signal lights, respectively, when the brake is advanced.

14. An attitude-indicating safety light signal system in accordance with claim 13, wherein said first lights of the several pairs of signal lights are adapted to be mounted adjacent the left side of such vehicle.

15. An attitude-indicating safety light signal system in accordance with claim 13, wherein the lights of said first pair of signal lights are red brake lights, the lights of said second pair are amber running lights and the lights of said third pair are white back-up lights.

16. An attitude-indicating safety light signal system for vehicles of the type having a vacuum source which operates concurrently with the vehicle engine, an accelerator linkage, a brake linkage, a transmission control and a voltage source having an ingition switch and a headlight switch connected thereto in separate circuits, comprising: three pairs of electrical signal lights, the members of each said pair being adapted to be mounted adjacent respectively opposite sides of a vehicle so as to be generally visible from the rear thereof; means normally connecting such headlight switch to a first of said pairs of signal lights and operable by such vacuum source to disconnect such light switch from said first pair of lights and to connect such ignition switch to a first circuit; means connected to such vacuum source and operable thereby to connect said first circuit to second and third circuits in repetitive alternation; means connected to and operable by such transmission control to establish the following electrical connections: in the PARK position, said second circuit to a first light of said first pair of signal lights, and said third circuit to the second light of said first pair of signal lights, in the REVERSE position, said second circuit to both of the lights of said first pair of signal lights, said third circuit to both of the lights of a second pair of said signal lights, and said ignition switch to both of the lights of a third pair of said signal lights, in the NEUTRAL position, said second circuit to said first light of said first pair of signal lights, and said third circuit to said second light of said first pair of signal lights, and in any of the forward DRIVE positions, said second circuit to a fourth circuit, and such ignition switch to a fifth circuit; pneumatically actuated means connected to such vacuum source and operable by such accelerator linkage to connect said fourth circuit to sixth and seventh circuits only when the accelerator is retarded, and to connect said fifth circuit to both of the lights of said second pair of signal lights only when the accelerator is advanced; pneumatically actuated means connected to such vacuum source normally connecting said third circuit to said first light of said first pair of signal lights and said second circuit to said second light of said first pair but operable in response to the advancement of the accelerator or brake of such vehicle to disconnect said second and third circuits from said first pair of signal lights and to connect said sixth and seventh circuits to eighth and ninth circuits, respectively, and pneumatically actuated means connected to such vacuum source and operable by both such accelerator and braking linkages for connecting said eighth and ninth circuits to the first and second lights of said second pair of signal lights, respectively, when the accelerator is advanced, and for connecting said eighth and ninth circuits to the first and second lights of said first pair of signal lights, respectively, when the brake is advanced.

17. An attitude-indicating safety light signal system in accordance with claim 16, wherein said first lights of the several pairs of signal lights are adapted to be mounted adjacent the left side of such vehicle.

18. An attitude-indicating safety light signal system in accordance with claim 16, wherein the lights of said first pair of signal lights are red brake lights, the lights of said second pair are amber running lights and the lights of said third pair are white back-up lights.

No references cited.

NEIL C. READ, *Primary Examiner.*

A. H. WARING, *Assistant Examiner.*